Figure 1:
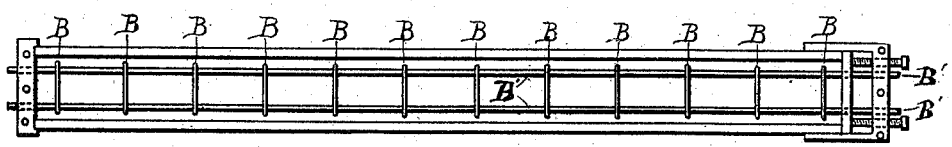

(No Model.)

E. L. TOY & A. T. HOLT.
RUBBER TIRE.

No. 575,445.            Patented Jan. 19, 1897.

Witnesses
Fred W. Nash
Chas Colahan

Inventors
Elias L. Toy
Albert T. Holt

UNITED STATES PATENT OFFICE.

ELIAS L. TOY AND ALBERT T. HOLT, OF AKRON, OHIO.

RUBBER TIRE.

SPECIFICATION forming part of Letters Patent No. 575,445, dated January 19, 1897.

Application filed September 26, 1896. Serial No. 607,021. (No model.)

*To all whom it may concern:*

Be it known that we, ELIAS L. TOY and ALBERT T. HOLT, citizens of the United States, residing at Akron, in the county of Summit and State of Ohio, have invented certain new and useful Improvements in Rubber Tires and the Manufacture Thereof, of which the following is a specification, reference being had to the accompanying drawings.

Our invention relates to that class of tires made of rubber in which the tire is provided with longitudinal apertures extending parallel through its length through which retaining-wires or any suitable band material are drawn, and as the tire is placed upon the wheel the ends are secured in the usual manner.

It has been found in the use of this form of tire, and also the supplemental rubber cushion that in some forms is made separate and apart when the tire is of circular form, that the apertures for the retaining-wires should be made and maintained centrally within the rubber and equidistant from the sides and from each other, and that the retaining-wires when in use upon the wheel under heavy pressure and constant wear are liable to become displaced and cut the rubber unless firmly held therein. There has also been great difficulty experienced in the manufacture of this rubber tire or cushion, as the apertures are produced by means of wire cores extending the entire length of the same within the mold, and said molding-wire cores, which are held at each end by constant lateral strain, are liable to become displaced and moved from their proper position within the rubber-mold during the formation of the tire or cushion and its apertures. This difficulty causes the production of an imperfect tire, as the wire-apertures should not deviate from a direct line equidistant from each other and from the sides throughout the entire length of the tire.

The object of our invention is to overcome these objections and difficulties in the manufacture and use of this form of tire or cushions and to enable us to produce a perfect article which would cheapen its manufacture and insure its durability in use.

Our invention consists in the application of a link, which may be made of metal or its equivalent, the link being provided at each end with eyes or holes, through which the wires extend at points equidistant throughout its length, which will maintain the molding-wires in proper place within the mold during the formation of the rubber, the links remaining firmly embedded within the same when the molding-wires are withdrawn, and the apertures are thus formed in their true and accurate position or place within the tire, and when the wires that are used to secure the tire or cushion to the wheel are placed therein and the ends united on the wheel the retaining-links hold the same and prevent it from displacement or wear within the rubber when in use.

Figure 3:
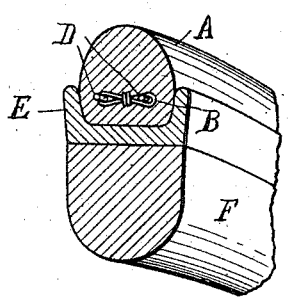
Figure 4:
Figure 2:
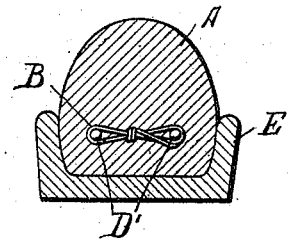
Figure 5:
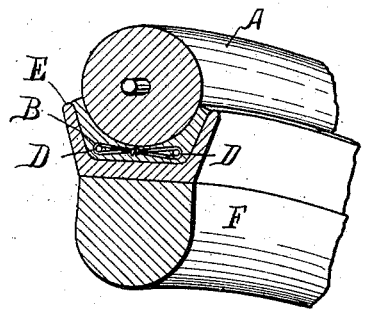

In the drawings, Figure 1 represents the molding-wires and the retaining-links placed thereon at regular intervals preparatory to molding the rubber. Fig. 2 is an end view of the rubber tire, with the retaining-links molded therein, as it rests upon the metallic tire of the wheel. Fig. 3 is a transverse view with the retaining-wires placed through the rubber tire and the eyes of the link. Fig. 4 is a detached view of the link. Fig. 5 is a transverse view of the link used in connection with a supplemental rubber cushion and a circular tire.

In the drawings, A represents the rubber tire; B, the retaining-link; B', molding-wires; D, the retaining-wire; D', the aperture within the rubber tire and the retaining link secured therein; D" D", eyes of the retaining-link; E, the metallic wheel-tire; F, the wooden felly or rim of the wheel.

When a single wire is used in a circular tire, it may be found desirable to separate one eye from the link, which may then be used vertically to support the molding-wire that is passed through the eye and prevent its displacement or sagging near the middle. In the process of molding the tire it aids materially in the accurate placement of the aperture within the center of the rubber, as the lower end of the link rests upon the bottom or inner side of the mold.

Having thus described our invention, what we claim, and desire to secure by Letters Patent, is—

1. In a rubber tire or cushion for vehicle-wheels having longitudinal apertures for the retaining-wires, the combination of connecting and supporting links provided with openings or eyes at each end which serve as a core-support and also to maintain the retaining-wires and prevent their displacement when in use substantially as described.

2. In a rubber tire or cushion transverse connecting-links having apertures within which the retaining-wires are threaded through the longitudinal openings in the tires as and for the purposes shown and described.

3. The transverse links B combined with the molding-wires B' to prevent displacement of the core in formation of the tire substantially as shown and described.

ELIAS L. TOY.
ALBERT T. HOLT.

Witnesses:
FRED W. NASH,
CHAS. COLAHAN.